July 25, 1950 R. SNEPVANGERS 2,516,534

TRANSDUCER SUPPORTING STRUCTURE

Filed Nov. 23, 1944

INVENTOR.
RENÉ SNEPVANGERS

BY C. D. Tuska

ATTORNEY

Patented July 25, 1950 2,516,534

UNITED STATES PATENT OFFICE 2,516,534

TRANSDUCER SUPPORTING STRUCTURE

René Snepvangers, Haddon Heights, N. J., assignor to Radio Corporation of America, a corporation of Delaware Application November 23, 1944, Serial No. 564,742

16 Claims. (Cl. 274—23)

Figure 1:
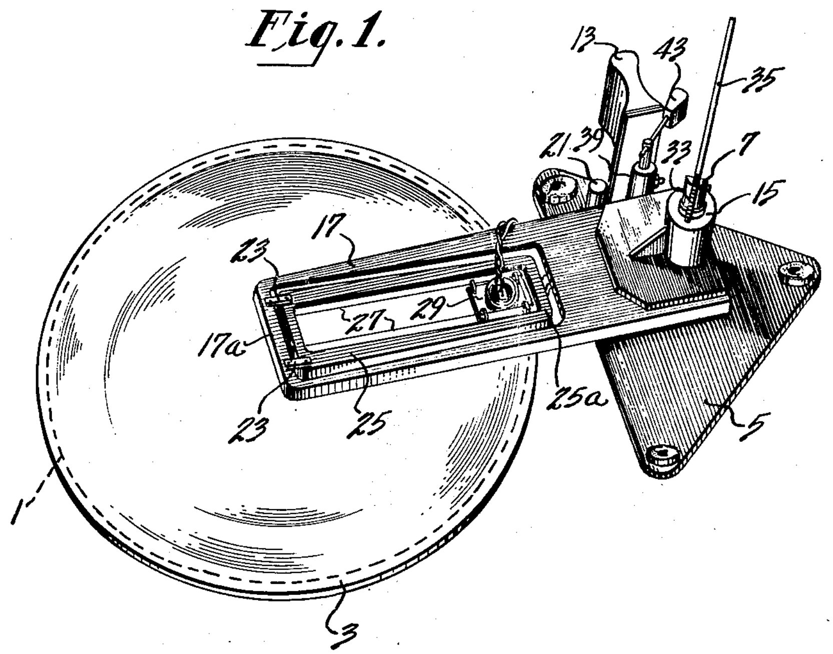

This invention relates to phonographic apparatus, and more particularly to a novel pick-up supporting structure thereof especially useful in connection with disc records.

It is well known that disc records very often become warped despite care that may be taken to prevent warping. Warped records more often than not result in distortion of the reproduced sound, usually in the form of rumble. While this may be tolerable in phonographs used in the home, it is a serious problem in connection with records from which re-recordings are made or which are used for dubbing. The problem is particularly serious when more or less conventional tone arms or pick-up arms are employed because of the troublesome resonances by which such arms are characterized.

The primary object of my present invention is to provide, for phonographic apparatus, an improved pick-up supporting structure useful particularly in connection with disc records and by means of which the difficulties mentioned above can be avoided.

More particularly, it is an object of my present invention to provide an improved pick-up supporting structure for phonographs in which not only troublesome resonances will be avoided, but which can be used even with bady warped records without permitting the troublesome rumble or other similar distortions to appear in the reproduced sound.

Another object of my present invention is to provide an improved pick-up mounting structure for phonographs which has a very small mass.

Still another object of my present invention is to provide an improved phonograph pick-up supporting structure which will impose a minimum load on the records during reproduction and on which, therefore, the record will be required to do a minimum amount of work, thereby increasing the record life.

A further object of my present invention is to provide an improved pick-up supporting structure which is especially useful with disc records and which will facilitate elimination of extraneous, unwanted sounds during reproduction.

Still a further object of my present invention is to provide an improved phonograph pick-up supporting structure as above set forth which will enable the stylus or needle of the pick-up to move readily across the record in a straight line, thereby avoiding changes in the tracking angle of the needle with respect to the record grooves and assuring a constant tangential relation between the needle and the groove.

It is also an object of my present invention to provide an improved phonograph pick-up supporting structure as above set forth which is simple in construction, inexpensive in cost and highly efficient in use.

In accordance with my present invention, I provide a first frame member which is pivotally mounted to one side of the turntable for swinging movement in a plane parallel to that of the turntable from a position to one side of the turntable to a second position substantially radially over the turntable, and vice versa. This frame has a freely suspended end which, when the frame is in the position radially over the turntable, is located at a point above the central region of the turntable (corresponding to the label area on conventional disc records). A second frame member of light weight is pivotally or flexibly suspended from the free end of the first frame member and extends in the opposite direction radially over the turntable, its freely suspended end terminating in proximity to the rim of the turntable. The second frame may be pivotally connected to the first frame by one or more leaf springs to provide a flexible suspension. By reason of this pivotal connection, the second frame member is free to swing toward and away from the turntable in a plane normal thereto for the purpose of freely accommodating a pick-up device slidably carried thereon to a record supported on the turntable for reproduction. Preferably, although not necessarily, the second frame member and the structure for mounting the pick-up device thereon are of the type disclosed and claimed in my copending application Serial No. 561,244, filed October 31, 1944. In any case, since the second frame member is pivotally mounted at a point over the central region of the turntable and its freely suspended end is adjacent to the periphery thereof, the pick-up carried thereby will be free to cooperate with the marginal portion of the record, where warping is always the greatest, without serious restraint. Also, since the supporting frame which carries the pick-up is very light in weight and has a low inertia, it is free from the troublesome resonances usually found in conventional pick-up arms. Accordingly, with the mounting of my present invention, distortion in reproduction will be reduced to a minimum.

Figure 2:
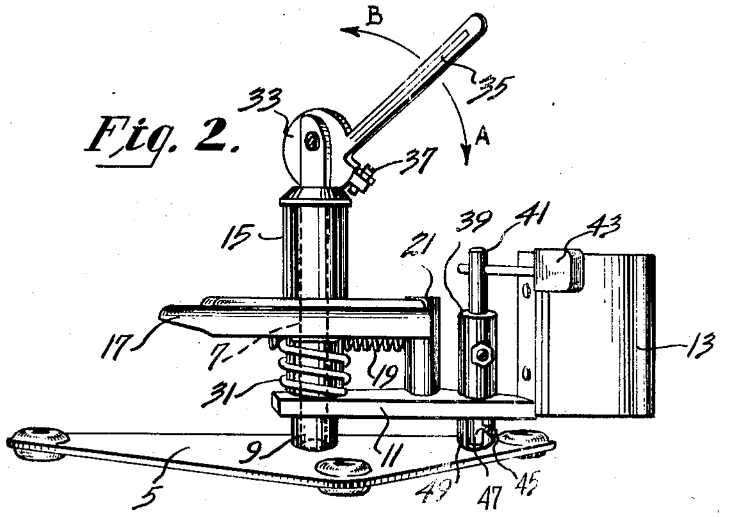

The novel features that I consider characteristic of my invention are set forth in particularity in the appended claims. The invention itself, however, both as to its organization and method of operation, as well as additional objects and advantages thereof, will best be understood from the following description of one embodiment thereof when read in connection with the accompanying drawing in which:

Figure 1 is a perspective view of one form of my present invention showing the pick-up mounting frames positioned over a record for reproduction thereof, and Figure 2 is an enlarged, end view thereof as seen from the right of Figure 1.

Referring more particularly to the drawing, wherein similar reference characters designate corresponding parts throughout, there is shown a turntable 1 which supports a disc record 3 in playing position. At one side of the turntable 1, there is a base plate 5 having an upstanding post 7 on which is rotatably mounted a sleeve 9 having a second plate 11 fixed thereto. Thus, the plate 11 is rotatable on the post 7 and may be manually rotated thereon by means of handle 13 which is secured thereto.

Slidably and rotatably mounted on the upper end of the post 7 is a sleeve 15 to which is secured and from which extends a first frame member 17. A coil spring 19 connects the frame 17 with a fixed post 21 on the plate 11 and holds the frame 17 against the post 21. Thus, as the plate 11 is rotated in response to the movement of the handle 13, the frame 17 rotates or swings with it on the post 7 in a plane parallel to the plane of the turntable 1.

Pivotally connected to or flexibly suspended from the freely supported end 17*a* of the frame 17 by means of one or more leaf springs 23 is a second frame member 25 which is made of light weight material, such as aluminum, and which is free to swing toward and away from the record 3 and the turntable 1 relative to the main frame 17 in a plane normal to that of the turntable. The frame 25 is provided with a pair of longitudinally extending, transversely spaced guide wires 27 which slidably carry a pick-up device 29 of any suitable type or construction and having a needle adapted to cooperate with the record 3. The frame 25, the guide wires 27, and the mounting of the pick-up 29 thereon are preferably of the type more particularly disclosed and claimed in my above identified copending application. However, any suitable type of pick-up device and suitable means for mounting it on the frame 25 may be employed.

The main frame 17 may be swung to one side of the record 3 and the turntable 1 to an inactive position (not shown). When this device is to be used, it is swung over the record 3 to the position shown in Figure 1 wherein the frames 17 and 25 and the guide wires 27 extend substantially radially over the record 3. The freely suspended end 17*a* of the frame 7 is then located at a point above the central region of the turntable. In this position of the main frame 17, the pick-up mounting frame 25 has its freely suspended end 25*a* disposed at a point in proximity to the edge of the record 3 or the periphery of the turntable 1. The pivotal axis of the pick-up mounting frame 25 extends through the mounting springs 23 in a direction substantially normal to the radial path of the pick-up device 29 across the record and may be disposed either along that diameter of the turntable which is normal to the radial path of the pick-up, or along the line parallel to this diameter. In any case, the important thing to observe is that the free end 25*a* of the pick-up mounting frame 25 is free to swing up and down in a plane normal to that of the turntable without serious restraint. Since warped records are warped mostly in their marginal regions and are seldom warped in their central regions, it is apparent that the arrangement described above will permit the pick-up device 29 and its mounting frame 25 to yield readily in response to the warped, marginal parts of the record without introducing appreciable distortion. At the same time, since the frame member 25 is of extremely light weight or mass, it will have no troublesome resonance peaks within the range of reproduction. These two factors combine to provide a sound reproducing device which can be used satisfactorily in re-recording, dubbing, and the like.

Normally, that is, when the frame assembly 17, 25 is moved to one side of the turntable, the assembly is held upwardly away from the plane of the turntable by a coil spring 31 which is interposed between the plate 11 and the frame 17. The upper end of the post 7 is bifurcated and has pivotally mounted thereon a cam 33 provided with a handle 35. The cam 33 cooperates with the upper end of the sleeve 15 and, when rotated in the direction of the appended arrow A, forces the sleeve 15 and the frame assembly 17, 25 down toward the plane of the turntable. Thus, after the frame assembly 17, 25 has been swung to the operating position shown in Figure 1, the handle 35 is moved in the direction of the arrow A to bring the needle of the pick-up device into engagement with the record. A set screw 37 carried by the cam 33 and cooperating with the upper end of sleeve 15 determines the extent to which the frame 17 can be lowered toward the record. To lock the assembly in this position against accidental displacement during operation, there is provided on the plate 11 a sleeve 39 which rotatably carries a post 41 having a handle 43 secured to its upper end. The post 41 extends through the plate 11 and has a pin 45 thereon which cooperates with a slot 47 formed in a sleeve 49 on the plate 5. When the handle 43 is turned counter-clockwise, the pin 45 engages in the horizontally inclined part of the slot 47 and locks the assembly in place. To unlock the assembly for movement to one side of the turntable, the handle 43 is moved clockwise to free its pin 45 from the slot 47 whereupon the assembly is free to be moved clear of the record and turntable, the handle 35 being first rotated in the direction of the arrow B to permit the spring 31 to raise the frames 17 and 25 and the pick-up 29 from the record.

From the foregoing description, it will be apparent to those skilled in the art that I have provided an improved pick-up mounting which is free from the difficulties of conventional mountings enumerated above and which is particularly useful in connection with the reproduction of sound from warped records. Although I have shown and descrbed but a single embodiment of my present invention, it will undoubtedly be apparent to those skilled in the art that many other modifications thereof, as well as changes in the particular one described, are possible within the scope of this invention. I therefore desire that my invention shall not be limited except insofar as is made necessary by the prior art and by the spirit of the appended claims.

I claim as my invention:

1. In phonographic apparatus, a turntable for supporting a disc record in playing position, a signal translating device adapted to cooperate with a record supported thereon, a mounting member extending substantially radially across said turntable and carrying said signal translating device for movement thereof substantially radially across the record, and means pivotally supporting said mounting member above said turntable along an axis substantially at right angles to the radius along which said mounting member extends across said turntable for swinging movement of said mounting member toward and away from said turntable, said axis also extending substantially along a diameter of said turntable.

2. In phonographic apparatus, a turntable for supporting a disc record in playing position, a supporting device pivotally mounted at one side of said turntable for movement to and from a position over said turntable, a mounting member pivotally carried by said supporting device and so located thereon that when said supporting device is in said position over said turntable said mounting member extends substantially radially across said turntable from a region near the center of said turntable outwardly toward the periphery thereof, said mounting member then being pivotally mounted on said supporting device along an axis over said region for swinging movement toward and away from said turntable, and a signal translating device adapted to cooperate with a record supported on said turntable, said signal translating device being movably mounted on said mounting member for radial movement across the record when said supporting device is in said position.

3. Phonographic apparatus according to claim 2 characterized in that the portion of said mounting member which is disposed in proximity to the periphery of said turntable when said supporting device is in said position is freely suspended.

4. Phonograhic apparatus according to claim 2 characterized by the addition of manually operable means in association with said supporting device for moving said supporting device to and from said position over said turntable.

5. Phonographic apparatus according to claim 2 characterized by the addition of means for releasably locking said supporting device in said position over said turntable.

6. Phonographic apparatus according to claim 2 characterized by the addition of manually operable means in association with said supporting device for moving said supporting device to and from said position over said turntable, and characterized further by the addition of means for releasably locking said supporting device in said position.

7. Phonographic apparatus according to claim 2 wherein said supporting device is pivotally mounted for swinging movement in a plane parallel to that of the turntable to and from said position thereover and is also mounted for movement toward and away from said turntable in a plane normal to that of said turntable, and characterized further by the addition of manually operable means for effecting said last named movement thereof.

8. Phonographic apparatus according to claim 2 wherein said supporting device is pivotally mounted for swinging movement in a plane parallel to that of the turntable to and from said position thereover and is also mounted for movement toward and away from said turntable in a plane normal to that of said turntable, characterized further by the addition of means in association with said supporting device constantly urging said supporting device away from said turntable in said normal plane, and characterized still further by the addition of manually operable means for moving said supporting device toward said turntable against the action of said last named means.

9. Phonographic apparatus according to claim 2 wherein said supporting device is pivotally mounted for swinging movement in a plane parallel to that of the turntable to and from said position thereover, and characterized still further in that said mounting member is pivotally carried by said supporting device for swinging movement of said mounting member toward and away from said turntable in a direction normal to the plane of said turntable.

10. In phonographic apparatus, a turntable for supporting a disc record in playing position, a first frame pivotally mounted at one said side of said turntable for swinging movement in a plane parallel to that of said turntable to and from a substantially radial position over said turntable, said frame having a freely suspended end which is disposed over substantially the central region of said turntable when said frame is in said radial position, a second frame pivotally suspended from said free end of said first frame and movable with said first frame to and from said position, said second frame having a freely suspended end in proximity to the rim of said turntable when said frames are in said position, and a signal translating device movably carried by said second frame for substantially radial movement over and for cooperation with a record supported on said turntable.

11. Phonographic apparatus according to claim 10 wherein said second frame is connected to said first frame by one or more leaf springs constituting a hinge connection therebetween.

12. In phonographic apparatus, the combination of a first support, means mounting said first support for movement in a predetermined plane, a second support carried by said first support and extending laterally therefrom in one direction for movement therewith in said plane, a mounting member pivotally carried by said second support along an axis which is spaced from said first support for movement in a second plane which is normal to said first plane, said mounting member extending from said axis in a direction opposite to said one direction and terminating in spaced relation to said first support, and a pick-up device carried by said mounting member.

13. Phonographic apparatus according to claim 12 characterized in that said pick-up device is slidably carried by said mounting member for movement longitudinally therealong.

14. Phonographic apparatus according to claim 12 characterized in that said second support is pivotally carried by said first support.

15. A device for supporting a phonograph signal translating unit in operative relation to a phonograph record which comprises a base structure adapted to be mounted at one side of the record, a supporting member comprising a first frame extending laterally from said base structure in one direction, means pivotally mounting said first frame for swinging movement relative to the record, a mounting member comprising a second frame pivotally carried at one end thereof by said supporting member along an axis spaced from said base structure and extending from said axis in the opposite direction, and means on said mounting member for supporting said unit thereon.

16. A device for supporting a phonograph signal translating unit in operative relation to a phonograph record which comprises a base structure, a supporting member extending laterally from said base structure in one direction, a mounting member pivotally carried by said supporting member along an axis spaced from said base structure and extending from said axis in the opposite direction, said mounting member being at all times freely suspended at the end thereof which is remote from said axis, said supporting member being mounted for swinging movement in a plane normal to the plane of pivotal movement of said mounting member on said supporting member, and means on said mounting member for supporting said unit thereon.

RENÉ SNEPVANGERS.

REFERENCES CITED

The following references are of record in the file of this patent:

UNITED STATES PATENTS

| Number | Name | Date |
|---|---|---|
| 837,274 | Apstein | Dec. 4, 1906 |
| 1,152,401 | Dennison | Sept. 7, 1915 |
| 1,284,988 | Baum | Nov. 19, 1918 |
| 1,473,005 | Bishop | Nov. 6, 1923 |
| 2,286,320 | Volf | June 16, 1942 |
| 2,363,655 | Dally | Nov. 28, 1944 |
| 2,369,087 | Thompson et al. | Feb. 6, 1945 |